(12) United States Patent
Simhi

(10) Patent No.: US 9,675,901 B2
(45) Date of Patent: Jun. 13, 2017

(54) SLIDES PROJECTOR BOOK DEVICE

(71) Applicant: Doron Simhi, Ramot Hashavim (IL)

(72) Inventor: Doron Simhi, Ramot Hashavim (IL)

(73) Assignee: Doron Simhi, Ramot Hashavim (IL)

( * ) Notice: Subject to any disclaimer, the term of this patent is extended or adjusted under 35 U.S.C. 154(b) by 0 days.

(21) Appl. No.: 15/034,971

(22) PCT Filed: Dec. 5, 2014

(86) PCT No.: PCT/IL2014/051064
§ 371 (c)(1),
(2) Date: May 6, 2016

(87) PCT Pub. No.: WO2015/092785
PCT Pub. Date: Jun. 25, 2015

(65) Prior Publication Data
US 2016/0293030 A1    Oct. 6, 2016

Related U.S. Application Data

(60) Provisional application No. 61/916,819, filed on Dec. 17, 2013.

(51) Int. Cl.
*A63H 33/38*    (2006.01)
*G03B 21/00*    (2006.01)
(Continued)

(52) U.S. Cl.
CPC .......... *A63H 33/38* (2013.01); *G03B 21/001* (2013.01); *G03B 21/142* (2013.01); *G03B 21/145* (2013.01); *G03B 21/206* (2013.01); *G03B 21/2013* (2013.01); *G03B 29/00* (2013.01); *G09B 5/02* (2013.01); *G09B 5/067* (2013.01)

(58) Field of Classification Search
CPC .......... A63H 33/38; G09B 5/067; G09B 5/02; B42D 3/123; G03B 21/10; G03B 21/30; G03B 29/00; G03B 21/001; G03B 21/145; G03B 21/2013; G03B 21/206
See application file for complete search history.

(56) References Cited

U.S. PATENT DOCUMENTS 3,652,994 A    3/1972    Scheibel
5,066,158 A *  11/1991    Huang .................. G02B 27/04
                                                    206/455
(Continued)

FOREIGN PATENT DOCUMENTS

WO    WO 94/12963 A1    6/1994

*Primary Examiner* — Bao-Luan Le
(74) *Attorney, Agent, or Firm* — Doron Semhi

(57) ABSTRACT

The present invention relates to a slides projector device for books, comprising: a) an optical unit that includes an array of light sources and a corresponding array of lenses, wherein each lens and its corresponding light source adapted to project a different image located on a corresponding elongated slide located between said arrays of light sources and lenses, wherein said optical unit is adapted to be located on the upper side of a book; and b) an operation unit that includes an array of switches each of which adapted to activate a corresponding light source in said array of light sources, wherein the array of switches is adapted to be located on an upright side of the book that is perpendicular to its upper side and parallel to the hinge side of said book.

11 Claims, 6 Drawing Sheets

(51) Int. Cl.
    *G09B 5/06*     (2006.01)
    *G09B 5/02*     (2006.01)
    *G03B 21/14*     (2006.01)
    *G03B 21/20*     (2006.01)
    *G03B 29/00*     (2006.01)

(56) References Cited

U.S. PATENT DOCUMENTS

| | | | | |
|---|---|---|---|---|
| 7,217,055 B2* | 5/2007 | Sabbagh | ............ | G09B 17/003 |
| | | | | 402/4 |
| 7,670,074 B2* | 3/2010 | Sabbagh | ............ | G09B 17/003 |
| | | | | 402/4 |
| 9,285,660 B2* | 3/2016 | Haseltine | ............... | G03B 21/10 |
| 2003/0205894 A1* | 11/2003 | Sabbagh | ............ | G09B 17/003 |
| | | | | 281/15.1 |
| 2006/0051158 A1* | 3/2006 | Sabbagh | ............ | G09B 17/003 |
| | | | | 402/73 |
| 2015/0070264 A1* | 3/2015 | Haseltine | ............... | G03B 21/10 |
| | | | | 345/156 |

* cited by examiner

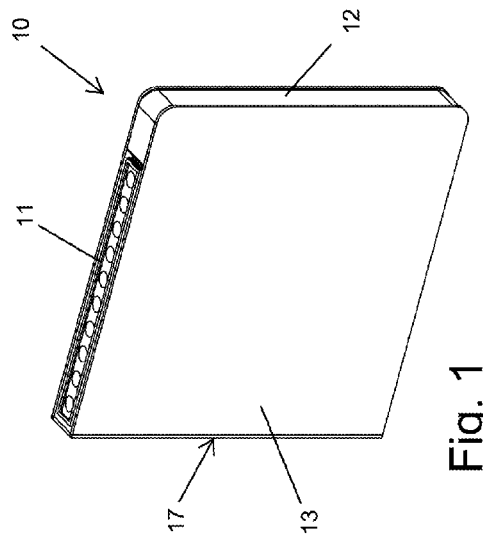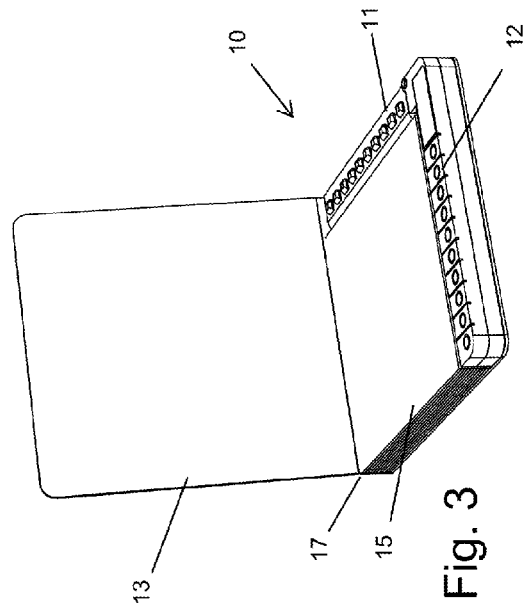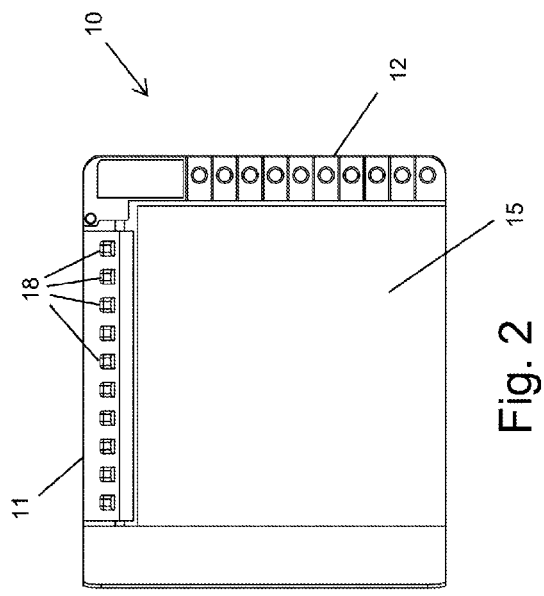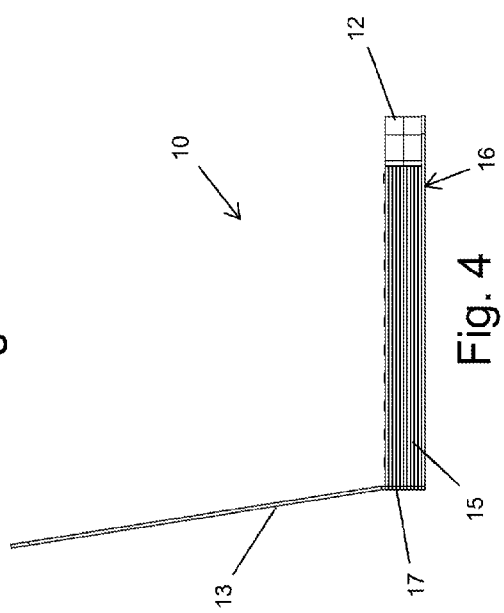

SLIDES PROJECTOR BOOK DEVICE

FIELD OF THE INVENTION

The present invention relates to the field of educational toys. More particularly, the invention relates to a device for projecting images, which may include visual information and reading material, while reading a book, thereby enriching the book reading experience.

BACKGROUND OF THE INVENTION

Reading is basic communication tool that let people, especially children, the ability to communicate. It may include shapes, letters, colors or any symbol that can be used to spread knowledge.

Learning to read is about listening, watching and understanding as well as working out print. Through hearing or visual watching stories, children are exposed to a rich and wide vocabulary. This helps them build their own vocabulary and improve their understanding when they listen or see which is vital as they start to read. It's important for them to understand how stories work as well. Even if child doesn't understand every word, they'll hear new sounds and see new words and phrases which they can then try out, copying what they have heard and see.

In order to enrich book reading experience, and thereby to let people, especially children, to enjoy from added value tools to develop verbal abilities, improve reading skills, enjoy the art of colorful and especially makes users smarter, there are books that come with a slide projector that let readers project story related images on the wall as they read, such as the "Toy Story 3 Movie Theater: Storybook & Movie Projector" as appears in the following URL link: http://www.amazon.co.uk/Toy-Story-Movie-Theater-Flashlight/dp/0794419992.

In other similar example, U.S. Pat. No. 7,670,074 discloses a video slide projection book. The video slide projection book has a front cover and a back cover connected to the front cover at a binding. Pluralities of pages are interposed between the front cover and the back cover and are connected to the binding. The video slide projection book also has a projector configured to accept a video slide source. The projector is configured to have a casing defining an interior volume; a circuit positioned in the interior volume and a lens. A holder is connected to the back cover wherein the holder is configured to accept the projector.

However, such video slide projection book lacks the ability to operate the projector while holding the book for reading (i.e., to do both actions at the same time—reading the book and operating the projector), as the projector is not an integral part of the book, and is provided as a standalone unit. Moreover, such projectors require that user to change slides each time they wish to view another slide, as the slides are provided in form of smaller disks.

It is an object of the present invention to provide a device which allows a user to operate the projector while reading the book.

It is another object of the present invention to provide a device which does not require the user to change disks while reading the book, but fluency reading and simply projecting the relevant slide.

It is yet another object of the present invention to provide a device that allows users adjust the projection angle to the projection surface.

It is yet another object of the present invention to provide a device which is capable of drawing the attention of children to read books.

Other objects and advantages of the invention will become apparent as the description proceeds.

SUMMARY OF THE INVENTION

The present invention relates to a slides projector device for books, comprising: a) an optical unit that includes an array of light sources and a corresponding array of lenses, wherein each lens and its corresponding light source adapted to project a different image located on a corresponding elongated slide located between said arrays of light sources and lenses, wherein said optical unit is adapted to be located on the upper side of a book; and b) an operation unit that includes an array of switches each of which adapted to activate a corresponding light source in said array of light sources, wherein the array of switches is adapted to be located on an upright side of the book that is perpendicular to its upper side and parallel to the hinge side of said book.

According to an embodiment of the invention, the device further comprises an internal lighting mechanism adapted to emit lights directed towards the internal pages of the book.

According to an embodiment of the invention, the device further comprises an energy saving unit for automatically turning off the slides projector or the light sources.

According to an embodiment of the invention, the energy saving unit is activated when the book is in a closed position.

According to an embodiment of the invention, the energy saving unit is activated when no switch is operated/pressed for a predetermined period of time.

According to an embodiment of the invention, the energy saving unit includes one or more sensors for detecting when the book is in a closed position.

According to an embodiment of the invention, the optical unit and the operation unit are integrated within the interior back cover of the book.

According to an embodiment of the invention, the device further comprises a microprocessor for controlling the operation of the slides projector.

According to an embodiment of the invention, the optical unit is adjustable for allowing adjusting the projection direction towards a desired surface.

In another aspect the invention relates to a slides projector book device, comprising:
a) a front cover of a book;
b) a back cover of a book;
c) a set of pages, wherein said front cover, said back cover and said pages are all fastened together to hinge at one side of the book device;
d) an optical unit that includes an array of light sources and a corresponding array of lenses, wherein each lens and its corresponding light source adapted to project a different image located on a corresponding elongated slide located between said arrays of light sources and lenses, wherein said optical unit is adapted to be located on the upper side of said book device; and
e) an operation unit that includes an array of switches each of which adapted to activate a corresponding light source in said array of light sources, wherein the array of switches is adapted to be located on an upright side of said book device that is perpendicular to its upper side and parallel to the hinge side of said book, wherein the optical unit and the operation unit are integrated within the interior of the back cover.

BRIEF DESCRIPTION OF THE DRAWINGS

In the drawings:

FIG. 1 schematically illustrates a perspective view a slide projection book in a close position, according to an embodiment of the invention;

FIG. 2 schematically illustrates a top view of the book of FIG. 1;

FIG. 3 schematically illustrates a perspective view of the book of FIG. 1 in an open position;

FIG. 4 schematically illustrates a side view of the book of FIG. 1 in an open position;

DETAILED DESCRIPTION OF THE INVENTION

Figure 5:
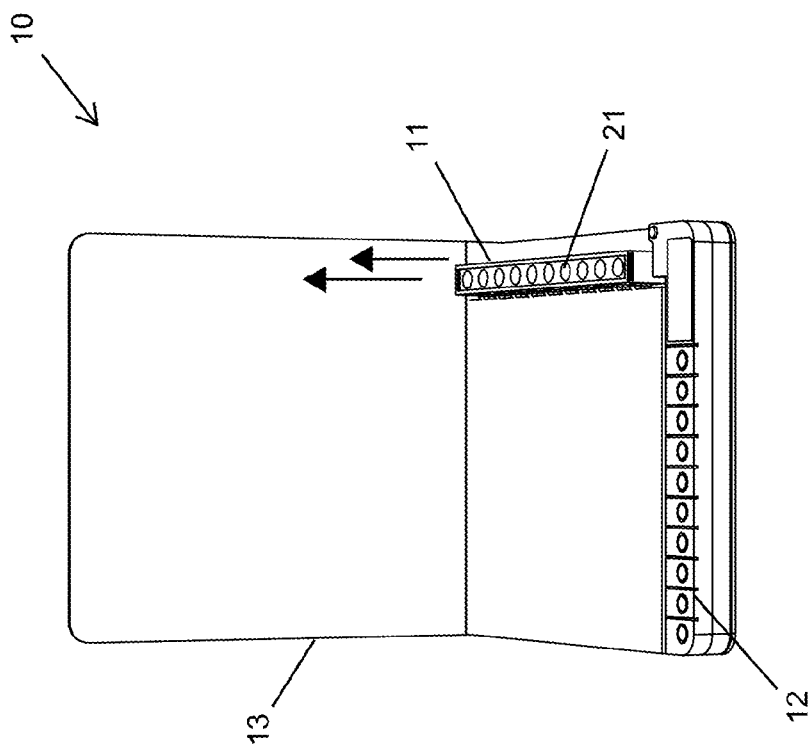
FIG. 5 schematically illustrates a perspective view of the book of FIG. 1 in an open position, showing an exemplary horizontal projection direction towards a facing wall or surface.
Figure 6:
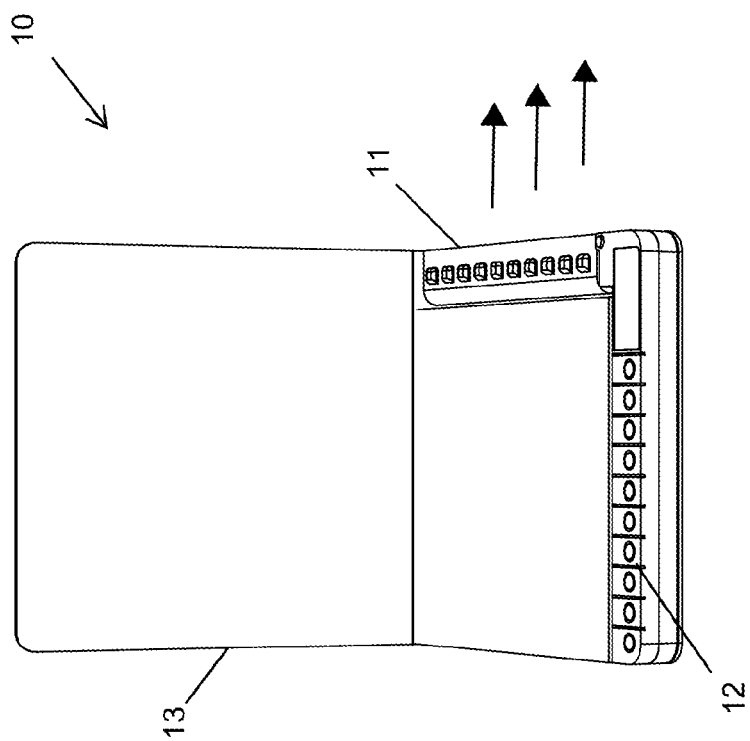
FIG. 6 schematically illustrates a perspective view of the book of FIG. 1 in an open position, showing an exemplary upright projection direction towards a ceiling.
Figure 8:
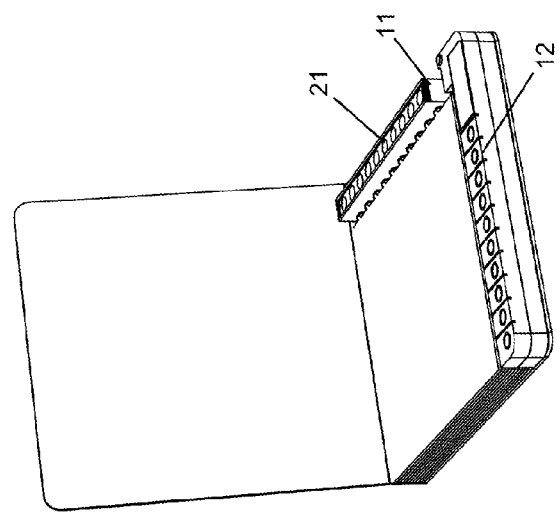
FIG. 8 schematically illustrates another perspective view of the book of FIG. 1 in an open position, showing an exemplary upright projection direction towards the ceiling.
Figure 7:
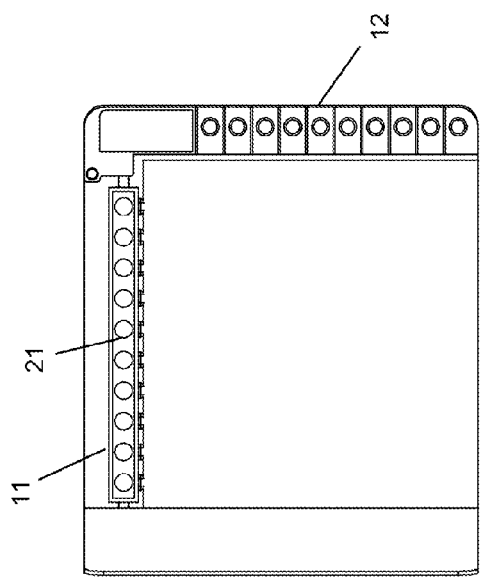
FIG. 7 schematically illustrates a top view of the book of FIG. 6.

The present invention relates to a novel slides projecting book device. According to an embodiment of the invention, the slides projecting book device includes two main element that are assembled to the interior of the back cover of the book (i.e., between the front cover and back cover), an operation unit and an optical unit. For example, for books in the English language, the operation unit can be located at the right side of the pages and the optical unit at the upper side accordingly.

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Referring to FIGS. 1-8, a slides projector book device 10 is shown, according to an embodiment of the invention. The slides projection book device 10 having a common book form that comprises a front cover 13, a back cover 16 and a set of written, printed, illustrated, or blank pages 15, made of ink, paper, parchment, cardboard or other materials, that are all fastened together to hinge at one side, as indicated by numeral 17. Device 10 further comprises an integrated slides projector that includes an optical unit 11 and an operation unit 12. The slides projector's units 11 and 12 are attached to the inner surface of the back cover 16. The slides projector's units can be powered by a battery based power source 14 (best seen in FIG. 12) as further described herein below.

In this embodiment, at least the last pages 15 inside book device 10 are smaller than the back cover 16 in their length and width, thereby allowing attaching the optical unit 11 and the operation unit 12 on the remaining space of the inner surface of the back cover 16, i.e., on at least part of the area that is not covered by the smaller pages 15 when they are placed on the back cover 16 side.

Due to the combination of the book with the slides projector in a unique and novel arrangement, children can experience a combination of a real book to read with the ability to project images that are related to the reading content on a surface such as a wall or a ceiling, while doing both actions of reading and projecting simultaneously. Moreover, a user may enjoy from inside light projecting (e.g., for night (dark) time reading) as well as adjust the projection angle to the projection surface, as will be described in further details hereinafter.

According to an embodiment of the invention, the unique and novel arrangement is achieved by placing the optical unit 11 on the edge of the upper side of the interior surface of back cover 16 of book device 10 and the operation unit 12 on the edge of the upright side of the interior surface of back cover 16 of book device 10 (herein the upright side refers to the side of book device 10 that is perpendicular to the upper side and parallel to the hinge side 17). Such an arrangement allows a user to easily operate the slides projector via the operation unit 12 by the user's fingers while commonly holding the book device 10 for reading at the upright side where the operation unit 12 is located.

According to an embodiment of the invention, the optical unit 11 is adjustable for allowing adjusting the projection direction towards a desired surface such as a wall or a ceiling, while holding the book in a suitable reading position for the user. For example, when holding book device 10 in an open position for reading while it is parallel to the floor, the optical unit 11 can be adjusted horizontally to project story images on a facing wall as indicated by the black arrows in FIG. 5. In another example, when holding book device 10 in an open position for reading while it is parallel to the floor, the optical unit 11 can be adjusted in an upright direction to project story images on a ceiling or a surface located above the book, as indicated by the black arrows in FIG. 6. The optical unit 11 can be adjusted to project images (e.g., visual information such illustrations, text, symbols, etc.) in a verity of directions, according to the preference of the user when holding the book in a specific reading position.

Figure 9:
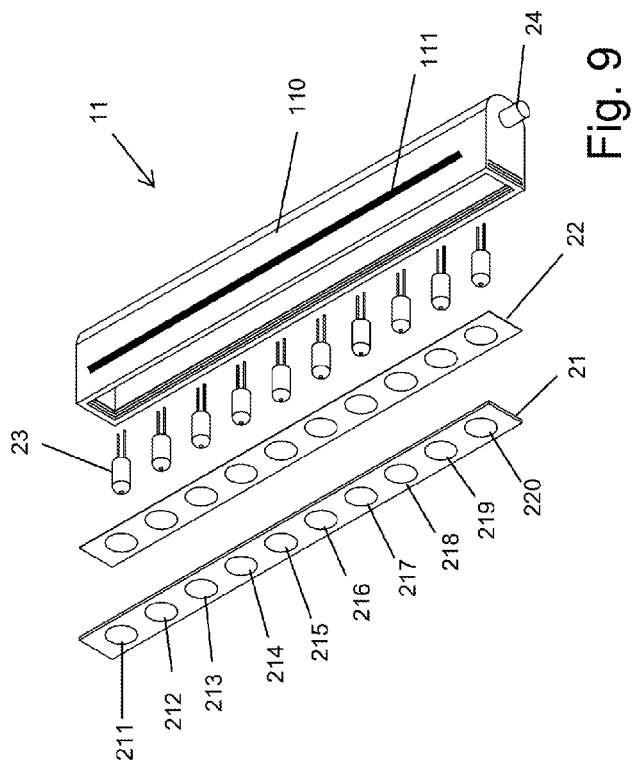
FIG. 9 schematically illustrates a detailed view of the optical unit of the slide projector of the book of FIG. 1, according to an embodiment of the invention.

Referring now to FIG. 9, the optical unit 11 is shown in a detailed view, according to an embodiment of the invention. Optical unit 11 comprises several elements: an array of light sources as indicated by numeral 23, an elongated slide 22 that includes an array of images, an array of lenses 21 and a body 110 for housing these elements. The number of images in slide 22 and the number lenses in the array of lenses 21 should correspond to the number of the light sources in the array of light sources 23, such that each single light source will project a specific image through a specific lens. Optionally, the optical unit 11 may include a focusing lens or a focusing mechanism (not shown). As shown in FIG. 9, the elements of optical unit 11 are arranged inside body 110 in the following order:

The array of light sources 23 arranged in a first row;

The elongated slide 22 is positioned at a middle row, such that each of the slide's images is located in front of a different light source 23; and The array of lenses 21 is located at the outer row, with respect to body 110, such that each lens corresponds to a different image of slide 22.

The ability to adjust the image projection direction of the optical unit 11 can be obtained in a variety of mechanism. For example, housing 110 can be moved in an up or down direction by allowing housing 110 to rotate around an axis as indicated by numeral 24. Housing 110 can be made from a rigid material such as plastic, for example, and be attached to the upper side of book device 10 such that the array of lenses 21 (i.e., the outer row) will face outside of book device 10.

Figure 10:
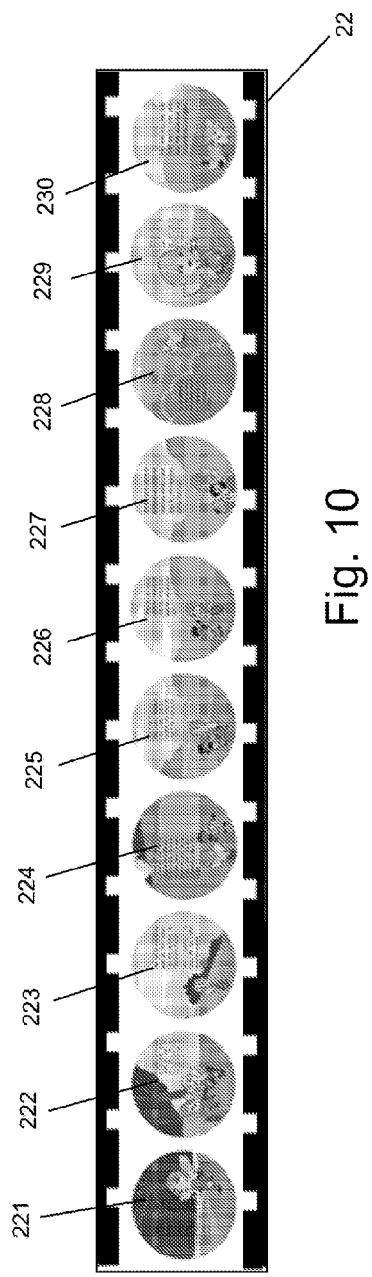
FIG. 10 schematically illustrates an array of slides adapted to fit the optical unit of FIG. 9, according to an embodiment of the invention.

FIG. 10 schematically illustrates an exemplary elongate slide 22, according to an embodiment of the invention. In this example, slide 22 includes 10 images (as indicated by numerals 221-230) each of which corresponds to a specific lens (as indicated by numeral 211-220 in FIG. 9) in the array of lenses 21.

The operating unit 12 is electrically connected to the optical unit 11 as will be further described herein below.

Figure 12:
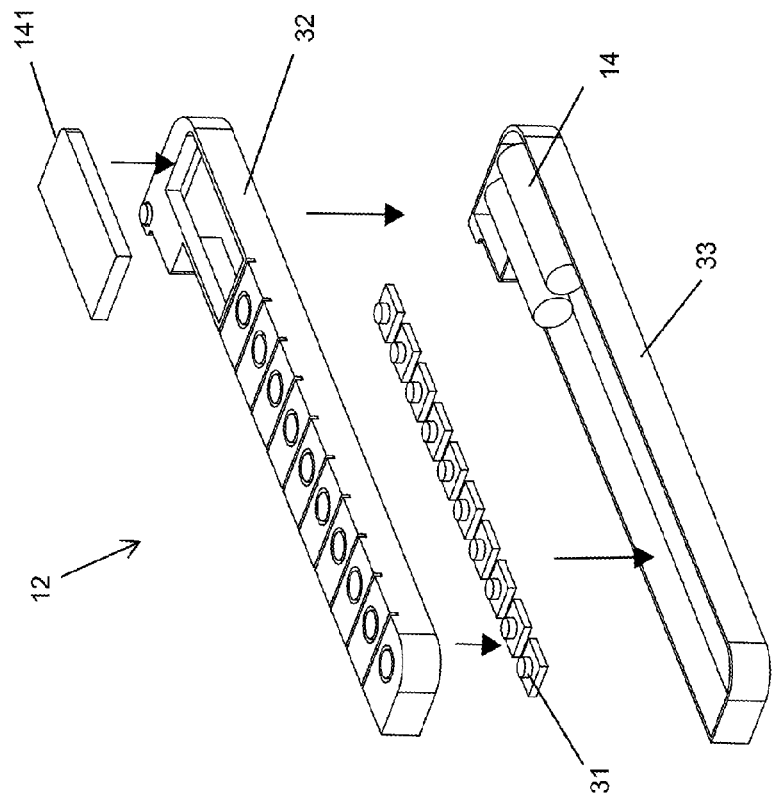
FIG. 12 schematically illustrates a detailed view of the operation unit of FIG. 11, according to an embodiment of the invention.
Figure 11:
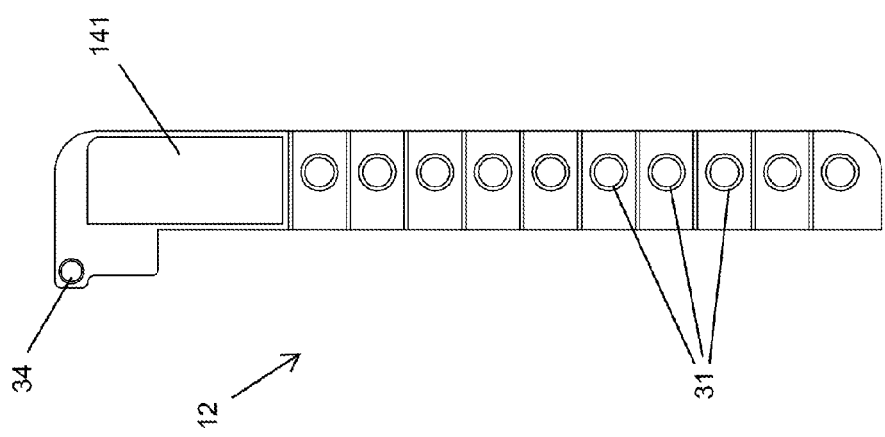
FIG. 11 schematically illustrates a top view of the operation unit of the slide projector of the book of FIG. 1, according to an embodiment of the invention.

Referring now to FIGS. 11 and 12, the operating unit 12 is shown in a detailed view, according to an embodiment of the invention. The operating unit 12 includes an array of switches 31 that are correspond to the array of light sources 23 in the optical unit 11 (FIG. 9). In this embodiment, a housing 33 is used to accommodate the array of switches 31 and the power source 14. Switches 31 can be secured in housing 33 by a corresponding cover 32. An optional access cover for the power source 14 is indicated by numeral 141, e.g., which can be used for replacing a battery.

Each switch may be marked with a corresponding page number or other relevant marking for helping the user to activate the correct light source that accordingly will project the relevant image. For example, when the user opens book device 10 and starts reading a page (e.g., page 1), in order to project the image that is relevant to the current page, the user needs to press the corresponding switch 31 that matches the current page number. According to an embodiment of the invention, the set of pages 15 can be cut in such a way that each page will cover the entire switches except the one that is relevant to that page (e.g., instead of marking the switches with page numbers).

Figure 13B:
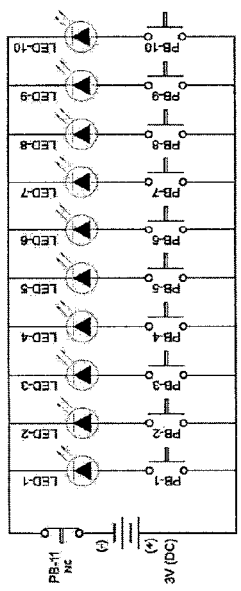
FIG. 13B shows an exemplary electronic circuit diagram for implementing the optical and operating units of FIGS. 9 and 12, according to an embodiment of the invention.
Figure 13A:
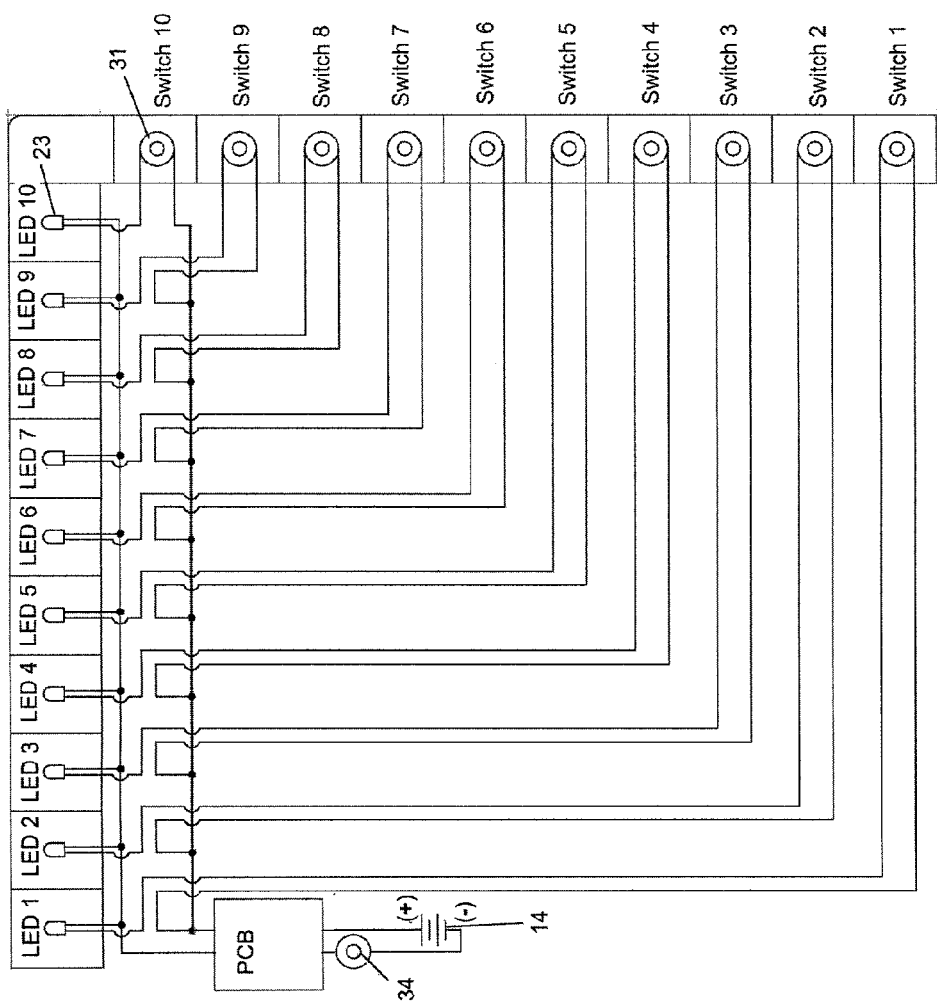
FIG. 13A shows an exemplary electronic circuit layout for implementing the optical and operating units of FIGS. 9 and 12, according to an embodiment of the invention.

Each switch 31 closes an electric circuit turning on the corresponding light source 23 (e.g., a LED) and project the corresponding image which is placed over that illuminated LED. In one embodiment, when a different switch is pressed, the relevant LED will be turned on, and the previous LED may automatically turn off (depending on the electronic circuitry configuration). An exemplary electronic circuitry for implementing the electrical operation of the slides projector units is shown in FIGS. 13A and 13B.

According to an embodiment of the invention, the electronic circuitry may include one or more sensors for automatically controlling the slides projector. For example, a proximity/optical sensor 34 (FIG. 11) can be used to detect when the book device 10 is in a closed position in order to allow the electronic circuitry to turn off a lighted LED. Alternatively, sensor 34 can be a switch that may manually turn off the slides projector when closing the book device 10 or when a user directly presses on it. The closed position of book device 10 refers herein to a normal close state of a typical reading book, i.e., when the front and back covers are parallel to each other.

According to an embodiment of the invention, book 10 further comprises an internal lighting mechanism for allowing reading the book also in a relatively dark environment, which sometimes required for better viewing of the projected images. The internal lighting mechanism can be an addition one or more light sources (e.g., LED) that is directed towards the internal pages of book 10 as for example indicated by cubes 18 on top of optical unit 11.

According to some embodiment of the invention, the slides projector is provided as a platform that is adapted to receive an existing book or be mounted to existing books, thereby allowing turning typical books into a slides projector book. In such arrangement, the elongated slide 22 is replaceable. For example, the housing 110 (FIG. 9) may include an access slot 111 (FIG. 9) for allowing the replacement of one elongated slide with another.

The functions described herein may be performed by state machines, and/or hardwired electronic circuits as shown in FIGS. 13A and 13B. However, these functions and much more can also be utilized by executable code and instructions stored in computer readable medium and running on one or more processor-based systems. According to an embodiment of the invention, the slides projector may include a microprocessor for expanding the functionalities of book 10. For example, while certain user inputs are described as being provided via presses on switches 31, optionally, using microprocessor user inputs can be provided using other techniques, such as by voice or otherwise. A microphone can be used to record (e.g., on a memory card) the reading of the book by one user (e.g., a father) in order to be played by another user (e.g., a son).

As will be appreciated by the skilled person the arrangement described in the figures results in an adjustable slides projector book, wherein the projection can be viewed on the ceiling or on the wall in accordance with the preference of the user which can adjust the projecting mechanisms projecting angle. In addition to simplicity of operation, this gives the possibility for children to interact and follow the reading by pressing the relevant buttons during the reading experience.

There are several reasons to encourage reading by the slides projecting book of the present invention, such as self-improvement through reading as the user (e.g., a child) begin to have a better understanding and greater memorizing, improve understanding (i.e., assuming that the more you read-and-see you will remember more) there is correlation between reading and seeing it in the same time, tools of communicating, as communication is the most important tool which can be transmitted through reading, encourages improves motor skills—a fine motor skill is any skill that involves the use of the small muscles in the hands, in accordance with what the eyes see. Fine motor activities include anything that requires the strength, coordination and precise movements of the hand muscles, this adjustable slides projecting book provide a perfect and effective coordination progress, imagination and creativity—by reading and watching the projecting "frame" you get more information and can see the small details, Sharing—the ability to share story and to encourage dialogs between children to parents, friends, brothers and sisters and more.

The terms, "for example", "e.g.", "optionally", as used herein, are intended to be used to introduce non-limiting examples. While certain references are made to certain example system components, other components can be used as well and/or the example components can be combined into fewer components and/or divided into further components.

All the above description and examples have been given for the purpose of illustration and are not intended to limit the invention in any way. Many different mechanisms, electronic and logical elements can be employed, all without exceeding the scope of the invention.

The invention claimed is:

1. A slides projector device for books, comprising:
   a) An optical unit that includes an array of light sources and a corresponding array of lenses, wherein each lens and its corresponding light source adapted to project a different image located on a corresponding elongated slide located between said arrays of light sources and lenses, wherein said optical unit is adapted to be located on the upper side of a book; and
   b) An operation unit that includes an array of switches each of which adapted to activate a corresponding light source in said array of light sources, wherein the array of switches is adapted to be located on an upright side of the book that is perpendicular to its upper side and parallel to the hinge side of said book.

2. A slides projector device according to claim 1, further comprising an internal lighting mechanism adapted to emit lights directed towards the internal pages of the book.

3. A slides projector device according to claim 1, further comprising an energy saving unit for automatically turning off the slides projector or the light sources.

4. A slides projector device according to claim 3, in which the energy saving unit is activated when the book is in a closed position.

5. A slides projector device according to claim 3, in which the energy saving unit is activated when no switch is operated/pressed for a predetermined period of time.

6. A slides projector device according to claim 3, in which the energy saving unit includes one or more sensors for detecting when the book is in a closed position.

7. A slides projector device according to claim 1, in which the optical unit and the operation unit are integrated within the interior back cover of the book.

8. A slides projector device according to claim 1, further comprising a microprocessor for controlling the operation of the slides projector.

9. A slides projector device according to claim 1, in which the optical unit is adjustable for allowing adjusting the projection direction towards a desired surface.

10. A slides projector book device, comprising:
    a) a front cover of a book;
    b) a back cover of a book;
    c) a set of pages, wherein said front cover, said back cover and said pages are all fastened together to hinge at one side of the book device;
    d) an optical unit that includes an array of light sources and a corresponding array of lenses, wherein each lens and its corresponding light source adapted to project a different image located on a corresponding elongated slide located between said arrays of light sources and lenses, wherein said optical unit is adapted to be located on the upper side of said book device; and
    e) an operation unit that includes an array of switches each of which adapted to activate a corresponding light source in said array of light sources, wherein the array of switches is adapted to be located on an upright side of said book device that is perpendicular to its upper side and parallel to the hinge side of said book.

11. A slides projector book device according to claim 10, in which the optical unit and the operation unit are integrated within the interior of the back cover.

* * * * *